US012564843B2

(12) United States Patent
Tattari et al.

(10) Patent No.: US 12,564,843 B2
(45) Date of Patent: Mar. 3, 2026

(54) CRUSHER ROTOR

(71) Applicant: Metso Finland Oy, Espoo (FI)

(72) Inventors: Joni Tattari, Tampere (FI); Ville Jarvenpaa, Kyroskoski (FI)

(73) Assignee: Metso Finland Oy, Espoo (FI)

(*) Notice: Subject to any disclaimer, the term of this patent is extended or adjusted under 35 U.S.C. 154(b) by 277 days.

(21) Appl. No.: 18/548,123

(22) PCT Filed: Mar. 7, 2022

(86) PCT No.: PCT/EP2022/055691
§ 371 (c)(1),
(2) Date: Aug. 28, 2023

(87) PCT Pub. No.: WO2022/189328
PCT Pub. Date: Sep. 15, 2022

(65) Prior Publication Data

US 2024/0139752 A1 May 2, 2024

(30) Foreign Application Priority Data

Mar. 9, 2021 (EP) .................................... 21161598

(51) Int. Cl.
*B02C 13/18* (2006.01)

(52) U.S. Cl.
CPC ................................ *B02C 13/1842* (2013.01)

(58) Field of Classification Search
CPC . B02C 13/18; B02C 13/1807; B02C 13/1814; B02C 13/1835; B02C 13/1842; B02C 2210/02
See application file for complete search history.

(56) References Cited

U.S. PATENT DOCUMENTS 3,970,257 A * 7/1976 MacDonald ........ B02C 13/1842 241/275
4,065,063 A * 12/1977 Johnson .............. B02C 13/1835 241/275

(Continued)

FOREIGN PATENT DOCUMENTS

DE 3610974 A1 10/1987
WO 2013140047 A1 9/2013
WO 2018005836 A1 1/2018

OTHER PUBLICATIONS

International Search Report and Written Opinion for International Application No. PCT/EP2022/055691, mailed Jul. 1, 2022.

(Continued)

*Primary Examiner* — Bobby Yeonjin Kim
(74) *Attorney, Agent, or Firm* — Andrus Intellectual Property Law, LLP

(57) ABSTRACT

A rotor for a comminution apparatus that is arranged to launch material to be comminuted towards a surface, such as an anvil or an autogenous layer of crushed material. The rotor includes a frame including an upper plate, a lower plate and wall elements extending between the upper plate and the lower plate. The rotor further includes an inlet opening in the upper plate and an outlet located between the upper plate and the lower plate. An uppermost surface of the frame and a lowermost surface of the frame have a greater hardness than the rest of the frame such that additional wear protection elements may be omitted at those uppermost and lowermost surfaces.

14 Claims, 4 Drawing Sheets

(56) References Cited

U.S. PATENT DOCUMENTS

| | | | | |
|---|---|---|---|---|
| 4,923,131 A * | 5/1990 | Rossouw | ............ | B02C 13/1842<br>241/300 |
| 11,260,395 B2 * | 3/2022 | Esbelani | ............ | B02C 13/1807 |

OTHER PUBLICATIONS

International Preliminary Report on Patentability for International Application No. PCT/EP2022/055691, dated Jul. 24, 2023.

* cited by examiner

CRUSHER ROTOR

CROSS-REFERENCE TO RELATED APPLICATIONS

This application is the U.S. national stage application of International Application PCT/EP2022/055691, filed Mar. 7, 2022, which international application was published on Sep. 15, 2022, as International Publication WO 2022/189328 A1 in the English language. The International Application claims priority European Patent Application No. 21661598.4 filed Mar. 9, 2021.

FIELD OF THE INVENTION

The present invention relates to crushing equipment for crushing rock, ore or similar. More specifically, the invention relates to a so-called vertical shaft impact crusher.

BACKGROUND ART

When crushing or grinding rock, ore, cement clinker and other hard materials, vertical shaft impact crushers may be used having a rotor rotating around a vertical axis. The material to be crushed is fed through a centrally arranged opening in an upper plate of the rotor. A distributor plate is arranged at an upper surface of a lower plate of the rotor. As the material to be crushed hits the rotating distributor plate, the material will be hauled generally radially outwardly and hit an outer crushing surface, typically comprising a build-up of material to be crushed created on an inner surface of a crushing chamber creating an autogenous crushing. Such autogenous crushing has proven to guarantee superior shaped particles, for example aggregate. However, in current rotors, there is a problem with balancing of the rotor and vibration of the rotor while the crusher is running. In addition, there is a lot of machining included during manufacturing process which makes rotor manufacturing challenging.

In an attempt to meet this problem, U.S. Pat. No. 4,923,131 suggests a rotary impact crusher rotor having a substantially triangular shape which may be made of heavy gauge mild steel to the outer surface of which is applied a hard facing material. International patent application WO2018/005836 suggests a reversible vertical impact crusher comprising a rotor having upper and lower plates, wherein the rotor comprises wear plates. A problem with the solutions disclosed by U.S. Pat. No. 4,923,131 A and WO2018/005836 is complex manufacturing and that balancing is not easily achieved. There is thus a need in the art for a more user-friendly manufacturing process for the rotor as well as to provide a rotor where the balancing is simplified, and vibrations of the rotor are decreased.

SUMMARY

It is an object to mitigate, alleviate or eliminate one or more of the above-identified deficiencies in the art and disadvantages singly or in any combination and solve at least the above-mentioned problem.

According to a first aspect there is provided a rotor for a comminution apparatus, said rotor being arranged to launch material to be comminuted towards a surface, such as an anvil or an autogenous layer of crushed material, said rotor comprising a frame including an upper plate, a lower plate and wall elements extending between said upper plate and said lower plate, the rotor further comprising an inlet opening in said upper plate and an outlet located between the upper plate and the lower plate, wherein an uppermost surface of the frame and a lowermost surface of the frame has a greater hardness than the rest of the frame such that additional wear protection elements can be omitted at those upper most and lowermost surfaces.

By manufacturing the rotor as a wear part compared to current rotors being protected by top and bottom wear plates, a less challenging manufacturing process is achieved because less machining is needed. Less machining is needed because of that the amount of wear parts and the amount of mating surfaces between the parts are reduced. The great amount of wear parts and mating surfaces, as in current rotors, require precise manufacturing but when manufacturing the rotor as the wear part, these challenges are reduced because of the reduced amount of wear parts and mating surfaces therebetween. A further advantage by having less parts is that the production cost is reduced. A yet further advantage by having less parts is that the assembly work is reduced as well.

The disclosed rotor is balanced at the factory and after that, there is no need for the customer to balance it anymore. Hence, no rotor turning is needed. Further, there is no need for replacing parts of the rotor when being worn to the limit but instead the whole rotor is replaced after the rotor is worn to the limit. Thus, a more straight-forward wear part change procedure is achieved which provides for a reduced time spent on maintenance. Thus, a further advantage of the rotor of the disclosure is that the maintenance operation or service at the customer side is reduced to large extent.

A yet further advantage of the rotor of the disclosure is that the material weight is reduced since the number of parts is reduced. By reducing weight of the rotor, there are less heavy lifting needed which provides for a safer design in maintenance and installation point of view. Also, due to the fact that the rotor is easier to change when worn to the limit means that less time has to be spent, which in turn reduces production downtime.

A yet further advantage of the rotor, where the uppermost surface and the lowermost surface of the frame has a greater hardness than the rest of the frame compared to current rotors being equipped with machined top and bottom wear plates bolted to a less hard rotor body, is that a more stable rotor is achieved.

It should be noted that the cost for the old wear plates is more or less the same as the cost for the whole disclosed rotor. As the manufacturing time and the maintenance operation time are reduced as well as the number of material parts needed, the costs are reduced compared to the conventional rotor.

Hence, the rotor is advantageous over the prior art in that it allows reducing the amount of wear parts and the amount of mating surfaces between such parts. This in turn facilitates balancing and reduces vibration of the rotor, leading to reduced weight of the rotor as well as decreasing costs and manufacturing time.

According to some embodiments, the frame is provided in the form of a weldment.

This is advantageous in that the manufacturing process may be easier as well as the manufacturing time is reduced. Thus, in the disclosed rotor only one weldment is needed compared to the current rotors where separate weldments are needed, and the machined bottom and top wear plate are bolted together with the rotor body. A further advantage of the disclosed rotor, wherein the frame is provided in the form of a weldment, is that the top and bottom wear plate assembly time is not needed as well as the time for turning rotor and bolting plates. Thus, the assembly time is reduced to a large extent.

According to some embodiments, the frame is balanced about its intended rotational axis.

This is advantageous as it allows the frame to be balanced in a correct way already during the manufacturing process. This balancing process is performed at the factory, as already mentioned above, and there is no need for the customer to balance the frame. Hence, the maintenance time for the customer is reduced.

According to some embodiments, the upper plate and the lower plate have a greater hardness than the wall elements.

According to some embodiments, wherein a ratio of the hardness of at least one of the upper plate and the lower plate to the hardness of at least one of the wall elements lies in a range of 1.3 to 5.3.

According to some embodiments, wherein a ratio of the hardness of at least one of the upper plate and the lower plate to the hardness of at least one of the wall elements lies in a range of 2.5 to 3.

This is advantageous as it generally is the upper plate and the lower plate that is exposed to more wear compared to the wall elements. Thus, an increased lifetime for the rotor is achieved.

In a preferred embodiment, the hardness of the upper plate and the lower plate is between 270-530 HB. In a preferred embodiment, the hardness of the wall element(s) is between 100-190 HB. In one embodiment the upper and lower plate have the same hardness. In other embodiments, the hardness may differ between the two plates. In one embodiment the separate wall elements have the same hardness. In other embodiments, the hardness may differ between the wall elements.

According to some embodiments, wherein a ratio of the tensile strength of at least one of the upper plate and the lower plate to the tensile strength of at least one of the wall elements lies in a range of 1.5 to 3.8.

According to some embodiments, wherein a ratio of the tensile strength of at least one of the upper plate and the lower plate to the tensile strength of at least one of the wall elements lies in a range of 2.2 to 2.6.

In a preferred embodiment, the tensile strength of the upper plate and the lower plate is between 1000-1400 MPa. In a preferred embodiment, the tensile strength of the wall element(s) is between 370-630 MPa.

In a preferred embodiment, the yield strength of the upper plate and the lower plate is between 900-1200 MPa. In a preferred embodiment, the yield strength of the wall element (s) is between 235-355 MPa.

According to some embodiments, the frame is configured to receive replaceable wear protection elements at exposed areas thereof.

The term "exposed areas" is here meant any area in the rotor that is exposed to wear when the rotor is running.

According to some embodiments, the replaceable wear protection elements are weight matched to reduce imbalance.

This is advantageous as it enables for the operator to replace the replaceable wear protection onsite without any need of balancing the rotor after the replaceable wear protection elements have been received by the rotor.

According to some embodiments, the replaceable wear protection elements comprise one or more of the following: cavity wear plates; trail plates; rotor tips; distribution plate arranged at the lower plate, downstream from the inlet.

According to some embodiments, the replaceable wear protection elements comprise cavity wear plates.

By the term "replaceable wear protection elements" is here meant that the wear protection elements may be removed and replaced in an easy way when they are worn out. Thus, instead of replacing the rotor itself, it is possible to replace the wear protection elements instead.

This is advantageous as it allows for an increased life of the rotor. The wear protection elements are arranged inside the rotor, e.g. tips, cavity wear plates, upper wear plates and lower wear plates. The life span differs between the different wear parts, but the life span of the different wear parts is less compared to the life span of the frame. Thus, by enabling the wear protection elements to be replaceable wear protection elements provides for that the life of the rotor is increased.

It should be noted that the replaceable wear parts of the current rotor preferably fit the disclosed rotor as well.

According to some embodiments, a circumference of the upper plate and the lower plate have a generally circular shape.

According to some embodiments, the upper plate and the lower plate have local recesses deviating from the circular shape.

This is advantageous as it allows to control the rotor performance. Thus, the shape of the upper plate and the lower plate has an influence on rotor performance. Therefore, the different shape of the upper plate and the lower plate enables different rotor performances. Thus, the shape of the upper plate and the lower plate is arranged for controlling the material being fed to the rotor.

An advantage of the rotor of the disclosure where the upper plate and the lower plate have local recesses deviating from the circular shape is that the total weight of the upper plate and/or lower plate is reduced such that the plates may be more user-friendly.

According to a second aspect, there is provided a method for manufacturing a rotor for a comminution apparatus, said rotor being arranged to launch material to be comminuted towards a surface, such as an anvil or an autogenous layer of crushed material, said method comprising the following steps

- providing rotor an upper plate having an inlet opening therein, a lower plate and wall elements;
- connecting said wall elements such that they extend between said upper plate and said lower plate and such that one or more outlets are created between the upper plate and the lower plate,
- wherein an uppermost surface of the upper plate and a lowermost surface of the lower plate has a greater hardness than the rest of the rotor such that additional wear protection elements may be omitted at those surfaces.

According to a third aspect, there is provided a comminution apparatus comprising a rotor in accordance with the first aspect.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended drawings, which shows presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
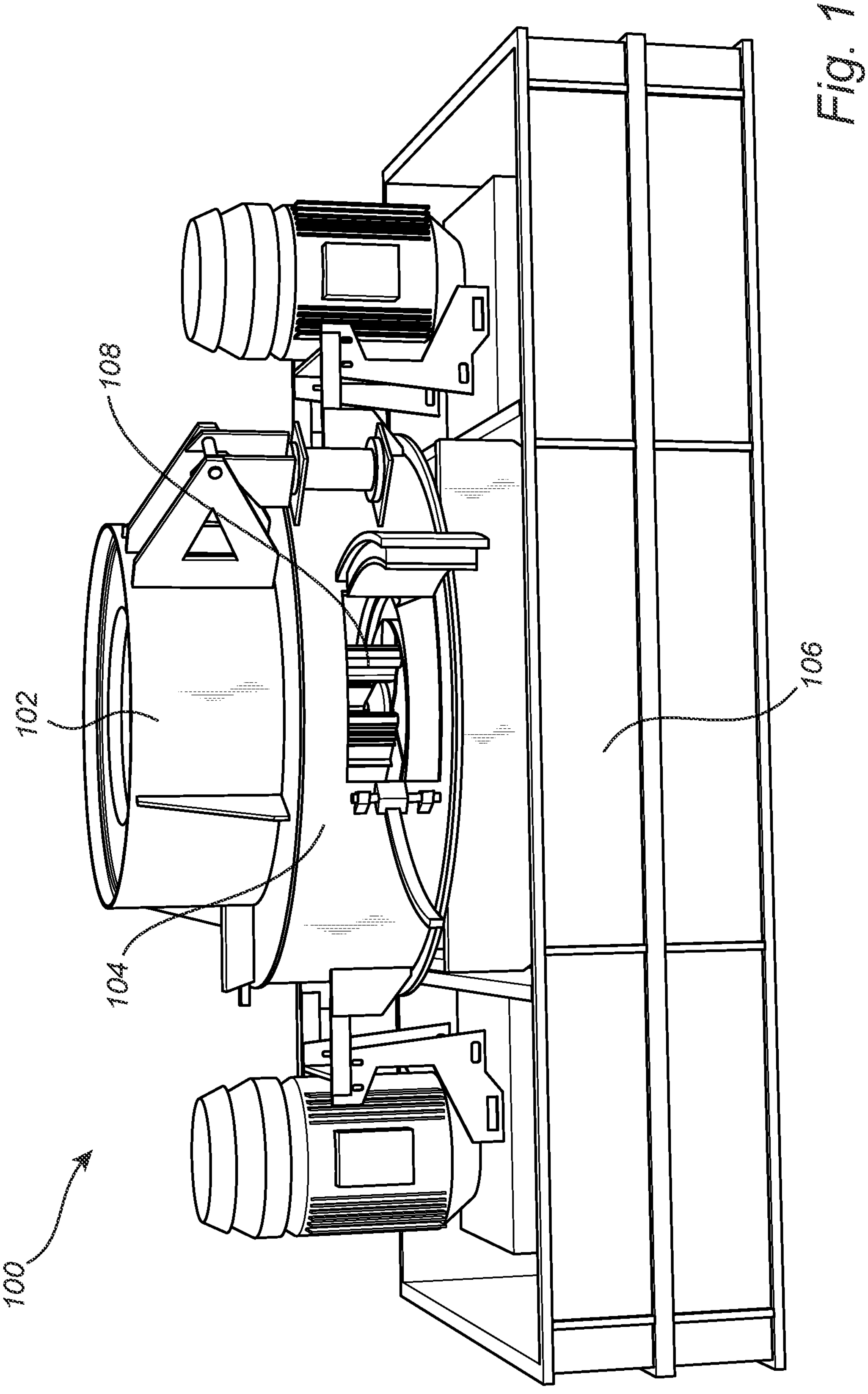
FIG. 1 shows a perspective view of a comminution apparatus.

FIG. 1 illustrates a comminution apparatus 100 for crushing or grinding rock, ore, cement clinker and other hard materials by way of example. The comminution apparatus 100 is configured to crush the materials by pushing them by force against metal but also by using the materials fed into the comminution apparatus 100 to crush itself. The comminution apparatus 100 may be a vertical shaft impact crusher. The crushing process of the comminution apparatus 100 will be discussed in further detail in connection with FIG. 2.

The comminution apparatus 100 comprises a roof 102 and a chamber 104. The chamber 104 is arranged on a base 106 of the comminution arrangement 100. The roof 102 is arranged on top of the chamber 104.

Figure 2:
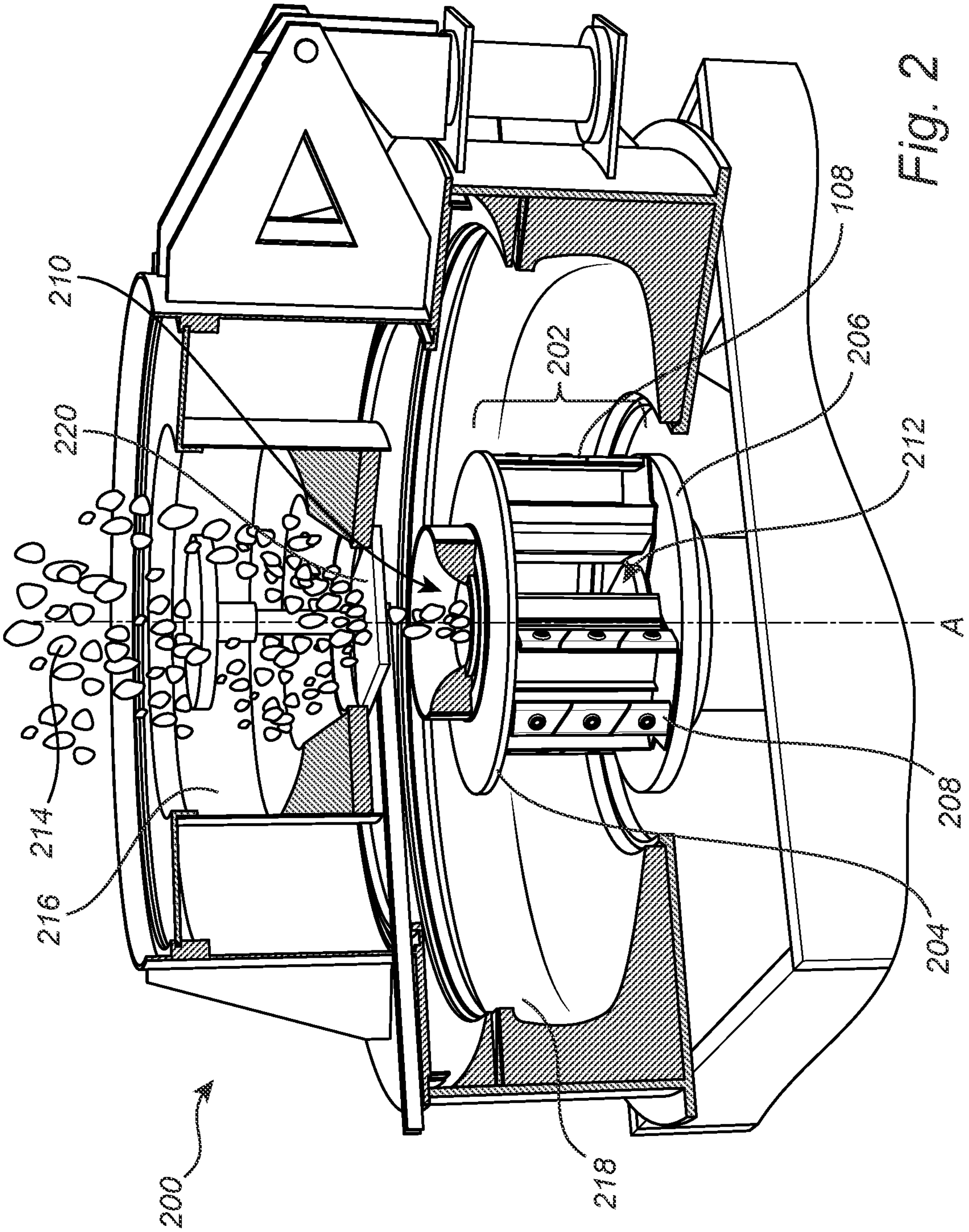
FIG. 2 shows an interior of the comminution apparatus of FIG. 1 comprising a rotor according to an embodiment of the present disclosure.

The comminution apparatus 100 further comprises a hopper 216 (see FIG. 2 for illustration). The hopper 216 is arranged inside the roof 102. The hopper 216 may comprise a centrally arranged opening in an upper part of the hopper 216. The hopper 216 may be configured to receive materials 216 to be crushed through the centrally arranged opening. The hopper 216 is further configured to feed the material 204 to the chamber 104.

The comminution arrangement 100 further comprises a rotor 108. The rotor 108 is arranged inside the chamber 102. The rotor 108 is configured to crush the material received in the chamber 102. Thus, the rotor is the main working component of the comminution apparatus 100. The rotor 108 will be further discussed in connection with FIGS. 2-4.

With reference to FIG. 2, the interior 200 of the comminution apparatus 100 is illustrated by way of example. Further to what have been discussed in connection with FIG. 1, the comminution apparatus 100 comprises a control gate 220. The control gate 220 may be arranged at a bottom end of the hopper 216. The control gate 220 is configured to alter cascade ratio. Thus, the control gate 220 is configured to control the amount of material 214 that is fed from the hopper 216 towards the rotor 108.

Further, the rotor 108 comprises a frame 202. The frame 202 includes an upper plate 204, a lower plate 206 and wall elements 208. The frame 202 is provided in the form of a weldment. The wall elements 208 extends between the upper plate 204 and the lower plate 206 and are perpendicular to the upper plate 204 and the lower plate 206. Put differently, the rotor 108 is manufactured by providing the rotor 108 with an upper plate 204, a lower plate 206 and wall elements 208. The wall elements 208 may be connected such that they may extend between the upper plate 204 and the lower plate 206. The rotor 108 further comprises an inlet opening 210 and an outlet 212. The inlet opening 210 is arranged in the upper plate 204. The outlet 212 is located between the upper plate 204 and the lower plate 206. The rotor 108 may comprise more than one outlet 212. The rotor 108 is illustrated in further detail in connection with FIGS. 3-4.

During operation of the comminution apparatus 100, the rotor 108 is configured to rotate. The rotor 108 is configured to rotate about a rotational axis A. The rotational axis is a vertical axis. Preferably, the rotor 108 rotates with 1800-3000 revolutions per minute (RPM) and a rotor tip speed may be up to 75 m/s. The maximum weight of the rotor 108 may be around 900-950 kg. Thus, with the heavy weight as well as the rather high speeds, the rotor 108 needs to be balanced in a correct way in order to perform the crushing process in the correct way. The rotor 108 is balanced at a factory, wherein the rotor 108 is produced. Forming the frame 202 of the weldment provides for that the rotor 108 only needs to be balanced at the factory and the consumer does not need to balance or turning the rotor 108 onsite. The rotor 108 may be balanced about its intended rotational axis A.

During operation, the materials 214 received by the rotor 108 are pushed away from the rotor 108 through the outlet 212 towards a surface 218. The surface 218 is arranged in the chamber 104. Put differently, the rotor 108 is configured to launch the material 202 to be comminuted towards the surface 218 within the chamber 104. The surface 218 may be an anvil. The surface 106 may comprise a build-up of material to be crushed, i.e. an autogenous layer of crushed material. The build-up in the comminution apparatus 100 is retained material, which forms the surface 218 over which feed material slides. It may form the shape of a wave with a crest towards the center of the rotor 108. The build-up may be arranged in the rotor 108 as well. The build-up in the rotor 108 is needed to protect the internal walls of the rotor 108 and most importantly, protect a rotor tip from direct wear and impact. The build-up may vary with material properties, rotor speed, feed rate, feed size and moisture content. This may provide for a crushing chamber creating an autogenous crushing. Such autogenous crushing has proven to guarantee superior shaped particles, for example aggregate. Preferably, the final product leaving the crusher 104 has a particle size of about 55 mm.

Figure 3:
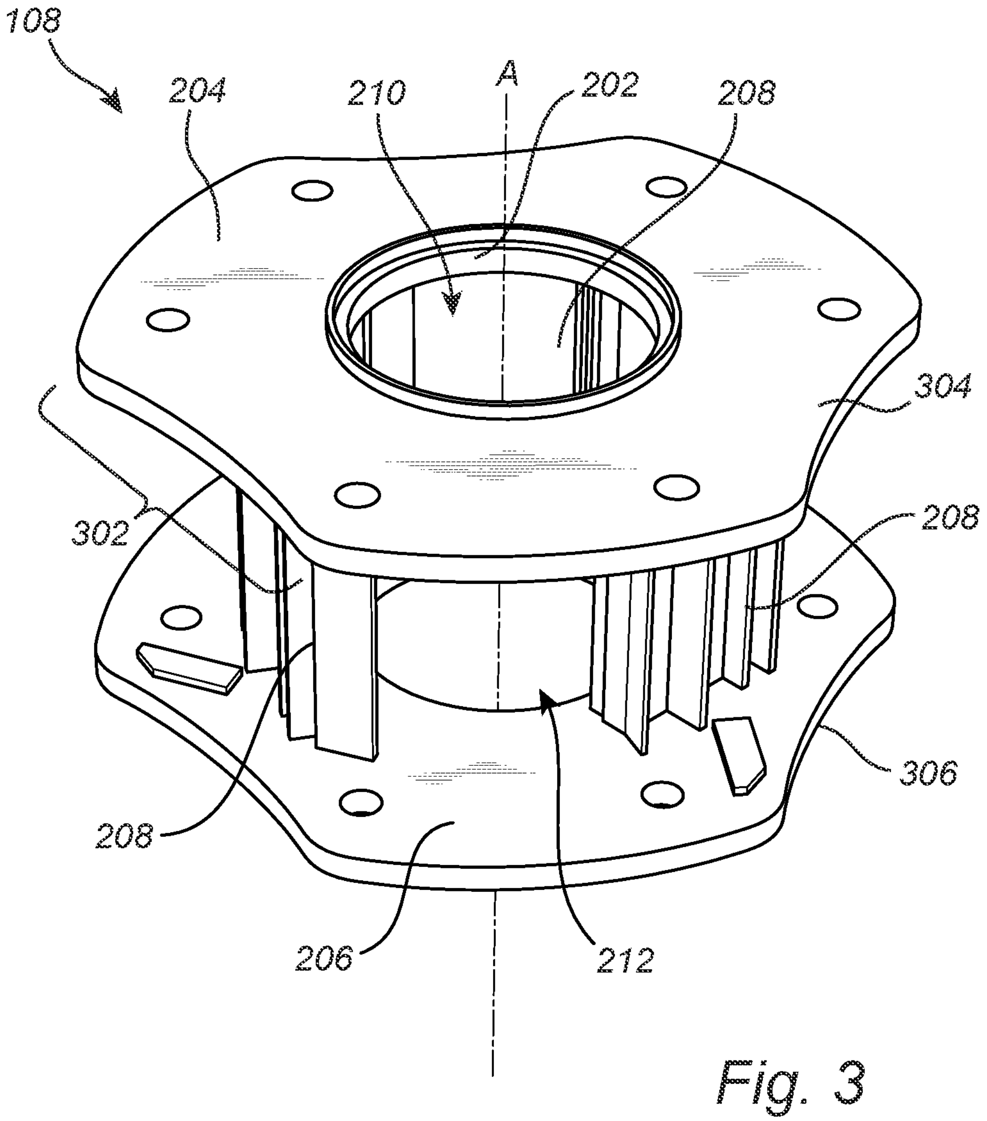
FIG. 3 shows a more detailed view of the rotor of FIG. 2.

With reference to FIG. 3, the rotor 108 is illustrated in further detail by way of example. As discussed in connection with FIG. 2, the rotor 108 comprises the frame 202 provided in the form of the weldment. The frame 202 includes the upper plate 204, the lower plate 206 and the wall elements 208.

The upper plate 204 may have a circumference that has a generally circular shape. The lower plate 206 may have a circumference that may have a generally circular shape. As illustrated in FIG. 3, the upper plate 204 and the lower plate 206 may have local recesses 302. The local recesses 302 may deviate from the circular shape. With the arrangement, wherein the upper plate 204 and/or the lower plate 206 may have local recesses 302, provides for a reduce in weight of respective plate 204, 206 compared to conventional rotors. This may be advantageous as it improves the manufacturing as well as the maintenance operation of the rotor 108.

The upper plate 204 and the lower plate 206 may have a greater hardness than the wall elements 208. A ratio of the hardness of at least one of the upper plate 204 and the lower plate 206 to the hardness of at least one of the wall elements 208 may lie in a range of 1.3 to 5.3. The ratio of the hardness of at least one of the upper plate 204 and the lower plate 206 to the hardness of at least one of the wall elements 208 may lie in a range of 2.5 to 3. A ratio of the tensile strength of at least one of the upper plate 204 and the lower plate 206 to the tensile strength of at least one of the wall elements 208 may lie in a range of 1.5 to 3.8. The ratio of the tensile strength of at least one of the upper plate 204 and the lower plate 206 to the tensile strength of at least one of the wall elements 208 may lie in a range of 2.2 to 2.6.

The rotor 108 may further comprise an uppermost surface 304 of the frame 202 and a lowermost surface 306 of the frame 202. The uppermost surface 304 is arranged on the upper plate 204. The lowermost surface 306 is arranged on the lower plate 206. The uppermost surface 304 and the lowermost surface 306 has a greater hardness than the rest of the frame 202. An advantage achieved when the uppermost surface 304 and the lowermost surface 306 has greater hardness than the rest of the frame 202 is that additional wear protection elements may be omitted at those uppermost and lowermost surfaces 304, 306.

Figure 4:
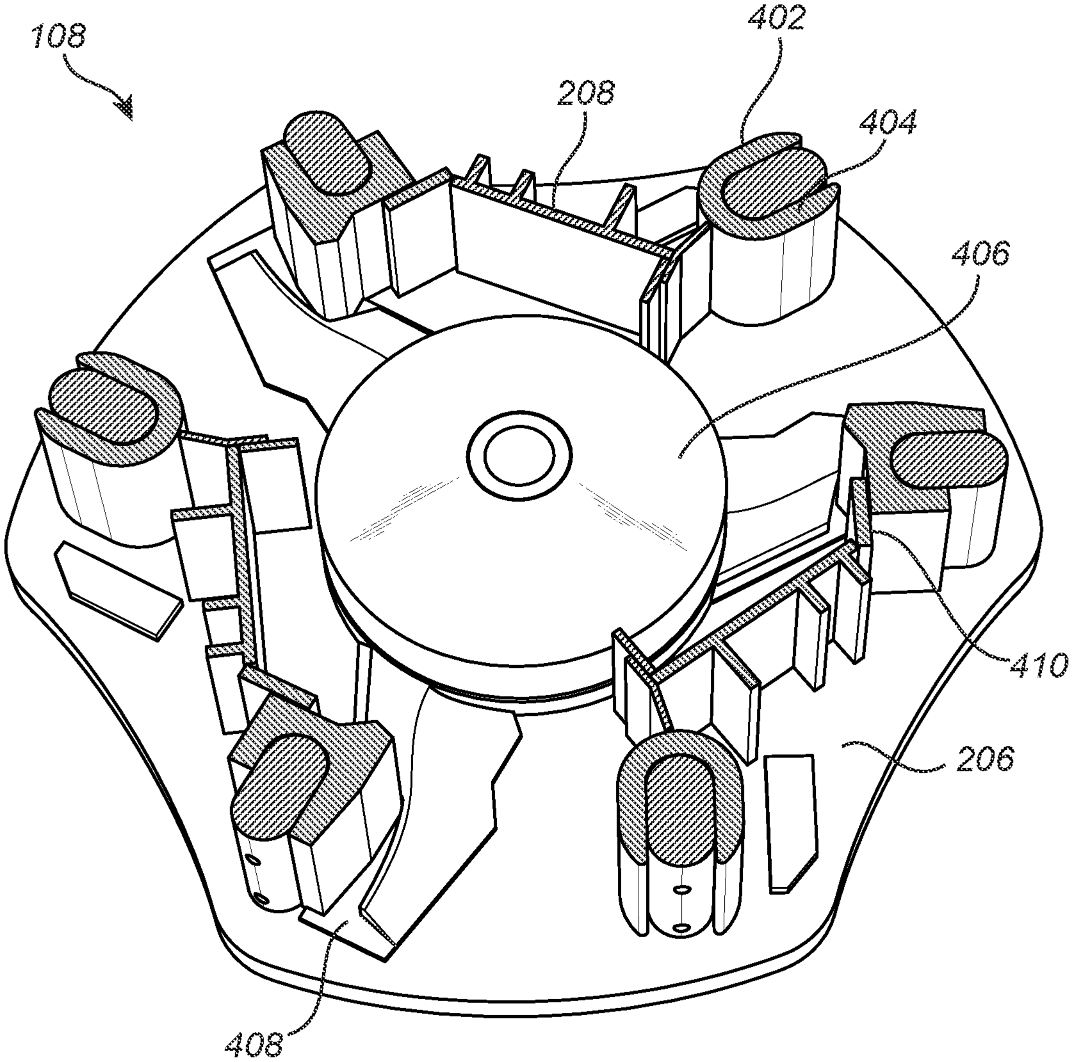
FIG. 4 shows an interior of the rotor of FIGS. 2 and 3.

With reference to FIG. 4, an interior of the rotor 108 is illustrated by way of example. The frame 202 is further configured to receive replaceable wear protection elements at exposed areas thereof. The replaceable wear protection elements may be weight matched to reduce imbalance. Preferably, the replaceable wear protection elements are weight matched within 5-10 grams.

The replaceable wear protection elements may comprise cavity wear plates 202. The replaceable wear protection elements may comprise rotor tips 404.

The replaceable wear protection elements may comprise a distribution plate 206 arranged at the lower plate 206, downstream from the inlet 210 such that the one or more outlets 212 may be created between the upper plate 204 and the lower plate 206. The distribution plate 406 is arranged on an upper surface pf the lower plate 206. Preferably, the distribution plate 406 is a rotating distribution plate and as the material to be crushed hits the rotating distributor plate 406, the material will be hauled generally radially outwardly, through the outlets 212, and hit the surface 218 as discussed in connection with FIG. 2. The distribution plate 406 may be designed in different ways depending on the material to be crushed.

The replaceable wear protection elements may comprise lower wear plates 408.

The replaceable wear protection elements may comprise trail plates 410. The arrangement of the trail plate 410 may control the material build-up. Wide trail plates 410 make the material build-up deeper. Narrow tail plates 410 make the material build-up shallower. Moving the trail plates 410 away from the rotor tip 404 make the build-up shallower. Moving the trail plates 410 towards the rotor tip 404 make the material build-up deeper. The angle of the trail plate 410 may control the depth of build-up at the top and bottom of the rotor 108. An angled trail plate 410, a trail plate 410 with a wide base and a narrow top, may direct material more to the top of the rotor 108, raising the wear path on rotor tips 404 and reducing clearance around feed tube. Straight trail plate 410 may tend to direct material to the bottom of the rotor tip 404 and increase clearance around feed tube.

Thus, it is understood that the purpose of the disclosure is to reduce the problems with balancing of the rotor 108 and vibration of the rotor 108 while the comminution apparatus 100 is running. A further purpose is to reduce the machining needed during the manufacturing process and thereby also reduce the manufacturing challenges.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. Rotor for a comminution apparatus, said rotor being arranged to launch material to be comminuted towards a surface, said rotor comprising a frame including an upper plate, a lower plate and wall elements extending between said upper plate and said lower plate, the rotor further comprising an inlet opening in said upper plate and an outlet located between the upper plate and the lower plate, wherein the upper plate and the lower plate has a greater hardness than the wall elements such that an uppermost surface of the frame and a lowermost surface of the frame has a greater hardness than the rest of the frame such that additional wear protection elements can be omitted at those upper most and lowermost surfaces.

2. Rotor in accordance with claim 1, wherein the frame is provided in the form of a weldment.

3. Rotor in accordance with claim 1, wherein the frame is balanced about its intended rotational axis.

4. Rotor in accordance with claim 1, wherein a ratio of the hardness of at least one of the upper plate and the lower plate to the hardness of at least one of the wall elements lies in a range of 1.3 to 5.3.

5. Rotor in accordance with claim 1, wherein a ratio of the hardness of at least one of the upper plate and the lower plate to the hardness of at least one of the wall elements lies in a range of 2.5 to 3.

6. Rotor in accordance with claim 1, wherein a ratio of the tensile strength of at least one of the upper plate and the lower plate to the tensile strength of at least one of the wall elements lies in a range of 1.5 to 3.8.

7. Rotor in accordance with claim 1, wherein a ratio of the tensile strength of at least one of the upper plate and the lower plate to the tensile strength of at least one of the wall elements lies in a range of 2.2 to 2.6.

8. Rotor in accordance with claim 1, wherein the frame is configured to receive replaceable wear protection elements at exposed areas thereof.

9. Rotor in accordance with claim 8, wherein the replaceable wear protection elements are weight matched to reduce imbalance.

10. Rotor in accordance with claim 8, wherein the replaceable wear protection elements comprise one or more of the following: cavity wear plates; trail plates; rotor tips; distribution plate arranged at the lower plate, downstream from the inlet.

11. Rotor in accordance with claim 1, wherein a circumference of the upper plate and the lower plate have a generally circular shape.

12. Rotor in accordance with claim 11, wherein the upper plate and the lower plate have local recesses deviating from the circular shape.

13. Method for manufacturing a rotor for a comminution apparatus, said rotor being arranged launch material to be comminuted towards a surface, said method comprising the following steps providing rotor an upper plate having an inlet opening therein, a lower plate and wall elements;

connecting said wall elements such that they extend between said upper plate and said lower plate and such that one or more outlets are created between the upper plate and the lower plate, wherein the upper plate and the lower plate has a greater hardness than the wall elements such that an uppermost surface of the upper plate and a lowermost surface of the lower plate has a greater hardness than the rest of the rotor such that additional wear protection elements may be omitted at those surfaces.

14. Comminution apparatus comprising a rotor in accordance with claim 1.

* * * * *